United States Patent [19]
Zhu et al.

[11] Patent Number: 5,649,113
[45] Date of Patent: Jul. 15, 1997

[54] METHOD AND SYSTEM FOR TRANSLATING AN OPTIMIZATION PROBLEM FOR USE IN EFFICIENT RESOURCE ALLOCATION

[75] Inventors: Jianhua Zhu, Lafayette; Yuping Qiu, Louisville, both of Colo.

[73] Assignee: U S WEST Technologies, Inc., Boulder, Colo.

[21] Appl. No.: 321,950

[22] Filed: Oct. 12, 1994

[51] Int. Cl.$^6$ ............................................. G06F 17/60
[52] U.S. Cl. ............... 395/207; 364/468.05; 364/468.09; 395/208
[58] Field of Search ................... 364/402, 401 R, 364/468, 468.05, 468.09; 395/207, 208

[56] References Cited

U.S. PATENT DOCUMENTS

| | | |
|---|---|---|
| 4,121,297 | 10/1978 | Smith . |
| 4,744,028 | 5/1988 | Karmarkar ............... 364/402 |
| 4,924,386 | 5/1990 | Freedman et al. . |
| 5,001,664 | 3/1991 | Makita et al. . |
| 5,128,860 | 7/1992 | Chapman . |
| 5,148,365 | 9/1992 | Dembo . |
| 5,216,593 | 6/1993 | Dietrich et al. ............... 364/402 |
| 5,291,397 | 3/1994 | Powell ............... 364/402 |
| 5,321,605 | 6/1994 | Chapman et al. ............... 364/402 |
| 5,343,388 | 8/1994 | Wedelin ............... 364/402 |
| 5,408,663 | 4/1995 | Miller ............... 395/650 |

*Primary Examiner*—Robert A. Weinhardt
*Assistant Examiner*—Joseph Thomas
*Attorney, Agent, or Firm*—Brooks and Kushman, P.C.

[57] ABSTRACT

An improved method and system for translating an optimization problem for use in efficient resource allocation. The improved method of the present invention includes the step of generating an index link record for each of the index variables in the optimization problem so as to eliminate the need for a symbol table and a plurality of temporary data records. The method also includes the step of linking the index link records of the index variables requiring expansion in a reverse order of the order listed in the optimization problem so as to reduce the number of traversals performed during expansion processing. The index link records have a pointer for identifying the next index variable requiring expansion.

6 Claims, 6 Drawing Sheets

| NAME | TYPE | LOWERBOUND | UPPERBOUND | VALUE |
|---|---|---|---|---|
| BAR | INDEX | 1 | 20 | NA |
| PLANT | INDEX | 1 | 2 | NA |
| MARKET | INDEX | 1 | 3 | NA |
| SUPPLY | COEFFICIENT | 1 | 2 | 600, 400 |
| DEMAND | COEFFICIENT | 1 | 3 | 200, 500, 200 |
| COST | COEFFICIENT | 1 | 6 | 10, 50, 80, 100, 60, 20 |
| SHIPMENT | INTEGER | NA | NA | NA |

FIG. 1 (PRIOR ART SYMBOL TABLE)

| INDEX VARIABLE NAME | ⎫ |
|---|---|
| LOWERBOUND LIMIT | ⎬ DEFINITION INFORMATION |
| UPPERBOUND LIMIT | ⎭ |
| CURSOR | ⎱ EXPANSION |
| POINTER | ⎰ INFORMATION |

FIG. 2

| PLANT | | MARKET | |
|---|---|---|---|
| 1 | | 1 | |
| 2 | | 3 | |
| 1 | | 1 | |
| END OF LIST | | PLANT | |

FIG. 3

METHOD AND SYSTEM FOR TRANSLATING AN OPTIMIZATION PROBLEM FOR USE IN EFFICIENT RESOURCE ALLOCATION

TECHNICAL FIELD

This invention relates generally to resource allocation methods and systems. In particular, this invention relates to a method and system for translating an optimization problem for use in efficient resource allocation.

BACKGROUND ART

The need for resource allocation decisions arises in a broad range of technological and industrial areas such as, for example, the assignment of transmission facilities in telephone transmission systems, inventory control, materials and operations management, as the routing of data services between related business offices. Resource allocation in this context means, in general, the deployment of specific technological or industrial resources for the production of particular technological or industrial results.

Resource allocation decisions are typically subject to constraints on such allocations. Resources are always limited in overall availability, and, furthermore, the usefulness of a particular resource in some particular application may also be limited. The problem, then, is to allocate the resources so as to satisfy all of the constraints and, simultaneously, to maximize the payoff, i.e., minimize the costs or maximize the benefits.

One method of solving resource allocation problems includes translating the resource allocation (or optimization) problem into a linear programming model. Such a model consists of a number of linear expressions that represent the quantitative relationships among allocations and constraints. The formal statement of a linear programming model takes the form of an objective function which is to be maximized or minimized, and a plurality of constraint relationships which express the physical constraints on acceptable allocations. The objective function and constraint relationships can be expressed in compact mathematical equations and definitions.

All objective functions and all constraint relationships can then be translated into linear programming format by algebraic manipulation. A known method of performing the required algebraic manipulation includes defining index variables and their properties, e.g., names, ranges and bounds, etc., and recording the same utilizing a symbol table during a syntax analysis phase. Subsequently, when an index variable is used as a range variable, its definition may be looked up and retrieved from a symbol table, as shown, for example, in FIG. 1. A temporary data record may then be created to hold the relevant definition information, plus any other relevant information that is necessary to carry out the desired expansion task.

With this approach, the temporary data record would need to contain certain amount of information that is redundant since the information is already stored in the symbol table. At a minimum, multiple copies of variable names must be kept in order to support name-based searches for uses of variables in algebraic expressions.

Other similar occurrences of redundancy are sometimes introduced during operation. For example, when two or more index variables are used to define a compound range, their records are usually linked together in a chronological order, which often times does not result in the most efficient way of processing them.

The known prior art fails to disclose an approach to algebraic modeling of an optimization problem that eliminates the need to keep redundant information regarding index variables during the expansion process.

Consequently, a need has developed for a means for efficiently translating an optimization problem which maximizes memory usage.

DISCLOSURE OF THE INVENTION

It is a general object of the present invention to provide an improved method and system for efficiently translating an optimization problem.

It is a further object of the present invention to provide an improved method and system for translating an optimization problem which optimizes memory usage.

It is yet another object of the present invention to provide an improved method and system for translating an optimization problem which reduces the number of pointer traversals needed during expansion processing.

In carrying out the above objects and other objects, features and advantages of the present invention, an improved method is provided for translating an optimization problem for use in efficient resource allocation.

The improved method includes the initial step of generating an index link record for each of the index variables in the optimization problem so as to eliminate the need for a symbol table and a plurality of temporary data records.

In keeping with the invention, index link records of the index variables requiring expansion are linked in a reverse order of the order listed in the optimization problem so as to reduce the number of traversals performed during expansion processing. The index link records have a pointer for identifying the next index variable requiring expansion.

In further carrying out the above objects and other objects of the present invention, a system is also provided for carrying out the steps of the above described improved method.

The system includes means, such as a processor, for generating an index link record for each of the index variables in the optimization problem. The index link records eliminate the need for a symbol table and a plurality of temporary data records.

Means are further included for linking the index link records of the index variables requiring expansion in a reverse order of the order listed in the optimization problem so as to reduce the number of traversals performed during expansion processing.

The system also includes a solver operatively connected to the generating and linking means to obtain a solution to the resource allocation problem.

The above objects, features and advantages of the present invention, as well as others, are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all of the views, wherein:

FIG. 1 is a schematic diagram of a symbol table utilized in the prior art method of translating an optimization problem;

FIG. 2 is a schematic diagram of an index link record utilized in the preferred embodiment of the present invention;

FIG. 3 is a schematic diagram of a linked list utilized in the preferred embodiment of the present invention;

BEST MODE FOR CARRYING OUT THE INVENTION

Figure 4A:
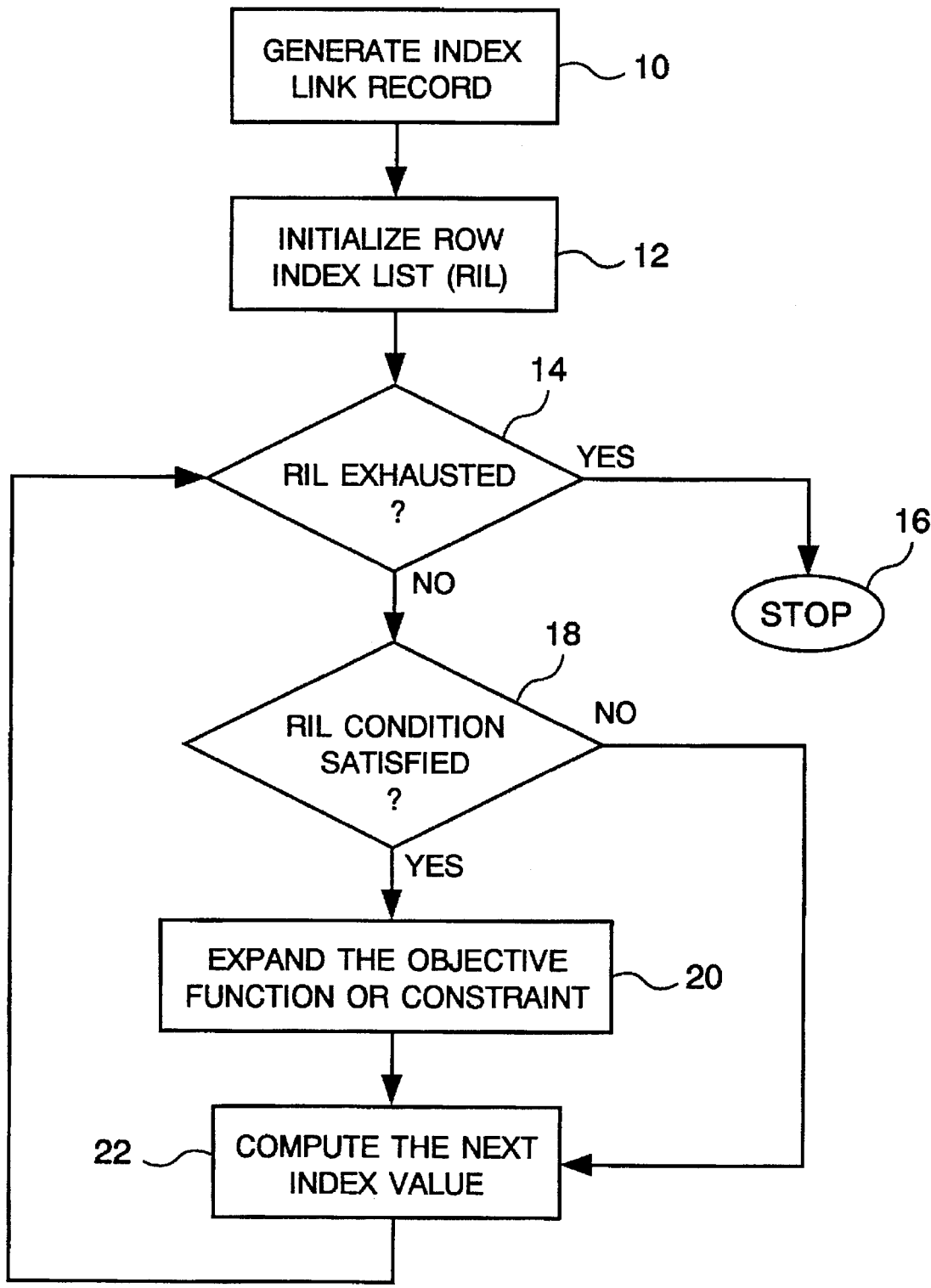
FIGS. 4A–4D are flowcharts illustrating the general sequence of steps associated with the operation of the present invention.

Returning to FIG. 1, the symbol table utilized by the prior art in translating an optimization problem is further discussed. Symbol tables are used to store information about a program. As known to those skilled in the art, the symbol table is constructed during the syntax analysis phase and is utilized to store variable information such as variable names and types. The symbol table is utilized only to store static program information. During processing of an objective function or constraint relationships, dynamic data records similar to the symbol table are required.

The method of the present invention can be illustrated by way of an example. An optimization problem may involve the shipment of goods from various plants to various markets in a least expensive way, given plant capacities, market demands and unit shipping costs. The objective function and the constraint relationships can be written as follows:

MINIMIZE:

SUM cost[plant, market]*shipment[plant, market]

SUBJECT TO:

Sum shipment[plant,market] $\leq$ supply[plant]

Sum shipment[plant,market] $\geq$ demand[market]

In the prior art method of translating an optimization problem, a symbol table similar to that of FIG. 1 would be generated during the syntax analysis phase. However, the method of the present invention provides an index link record to be generated for each index variable during the syntax analysis phase. The index link record is illustrated in FIG. 2.

The index link record combines static (or definition) information and dynamic (or expansion) information into one record, thereby eliminating the need for a symbol table and a temporary data record. The definition information includes the name of the index variable and its corresponding upper-bound and lower-bound ranges.

In addition to the definition information, memory space is also reserved for expansion information used for later expansion processing. The expansion information includes a pointer for identifying the next index variable requiring expansion in the optimization problem. The expansion information also includes a cursor for ranging from the lower-bound limit to the upper-bound limit of the corresponding index variable.

The next step of the improved method of the present invention includes linking the index link records of the index variables requiring expansion in a reverse order of the order listed in the optimization problem. The reverse order effectively reduces the number of pointer traversals needed during expansion processing since the most frequently incremented index variables are placed in the front of the list in the present invention.

The index link records for the objective function listed above with index variables "plant" and "market" would be linked in a reverse order, as shown in FIG. 3. The expansion processing would begin with the "market" index variable. Upon completion of the expansion of "market", the expansion processing would shift to the "plant" index variable since "market's" pointer points to "plant."

A computer program utilized to link the index link records in a reverse order is as follows:

1. Set the dynamic list pointer (DL) to end-of-list
2. Get first index variable name, ixname
3. If no more index variable name, stop
4. Search in index link records for index variable record with name ixname, ixrec
5. Initialize ixrec: set its cursor value to that of its lower-bound limit
6. Link ixrec into DL (in reverse order):
   6.1 Have its pointer point to that pointed to by DL
   6.2 Have DL point to ixrec
7. Get next index variable name, ixname
8. Go to 3

The linking of the index link records in a reverse order when combined with a row-major expansion strategy give rise to the following efficient index computation procedure:

1. Set ix (pointer) to first index variable
2. If ix is end of list, stop; o.w., goto 3
3. If cursor of ix less than its upper-bound limit, goto 4; o.w., goto 5
4. Increment the cursor of ix, stop
5. If ix not last index variable, reset its cursor to the lower-bound limit
6. Set ix to the next index variable, goto 2.

Therefore, the present invention provides a method of efficiently reducing an optimization problem having an objective function and at least one constraint relationship into an expanded form. The expanded form is then normalized into standard linear programming format for use with a solver to obtain a solution in efficiently allocating resources. A typical solver known by those skilled in the art include commercial solvers such as Simplex, CPLEX, or Karmarker. The resource is then physically allocated in accordance with the solution obtained by the solver 72.

Turning now to the flowcharts of FIGS. 4A–4D, the general sequence of steps associated with expanding the objective function and the constraint relationships are illustrated.

The first step in processing the optimization problem includes the step of generating an index link record for each index variable as shown by block 10.

The method continues with the step of initializing the Row Index List (RIL) as shown by block 12. This step is accomplished utilizing the program outlined above for linking the index link records together in a reverse order.

Next, the method continues with the step of determining whether the RIL is exhausted, as shown by conditional block 14. In other words, this step involves determining whether the end of the linked records has been met. If the RIL is exhausted, no further expansion is required and the program stops as shown by block 16.

If the RIL is not exhausted, the method continues with an optional step of determining whether the RIL condition has been satisfied, as shown by block 18. This step eliminates terms or index variables from the expansion process. For example, the resource allocation problem may exclude a plant located in Boulder and one located in Denver. In this case, the program will continue to the next step, 20, if these terms are not in the RIL.

If the RIL condition is satisfied, the method continues with the step of expanding the objective function or constraint, as shown by block 20, otherwise the method proceeds to block 22 and computes the next index value, to be described below. The step of expanding the objective function or constraint is illustrated in FIG. 4B.

In expanding the objective function or constraint, the method determines what kind of expression is to be processed.

If the expression type is an "ADD" (or addition) expression, the method proceeds with expanding the ADD expression accordingly as reflected by blocks 24 and 26.

If a "SUB" (or subtraction) expression is to be processed, the method proceeds with expanding the SUB expression accordingly as shown by blocks 28 and 30.

Furthermore, if the expression type is a "MUL" (or multiplication) expression, the method proceeds with expanding the MUL expression accordingly as shown by blocks 32 and 34.

If a "DIV" (or division) expression is to be processed, the method proceeds with expanding the DIV expression accordingly as shown by blocks 36 and 38.

If the expression type is a "SUM" (or summation) expression, the method proceeds with expanding the SUM expression accordingly as shown by blocks 40 and 42.

Finally, if the expression type is a simple expression, the method proceeds with expanding the simple expression as shown by block 44.

Figure 4B:
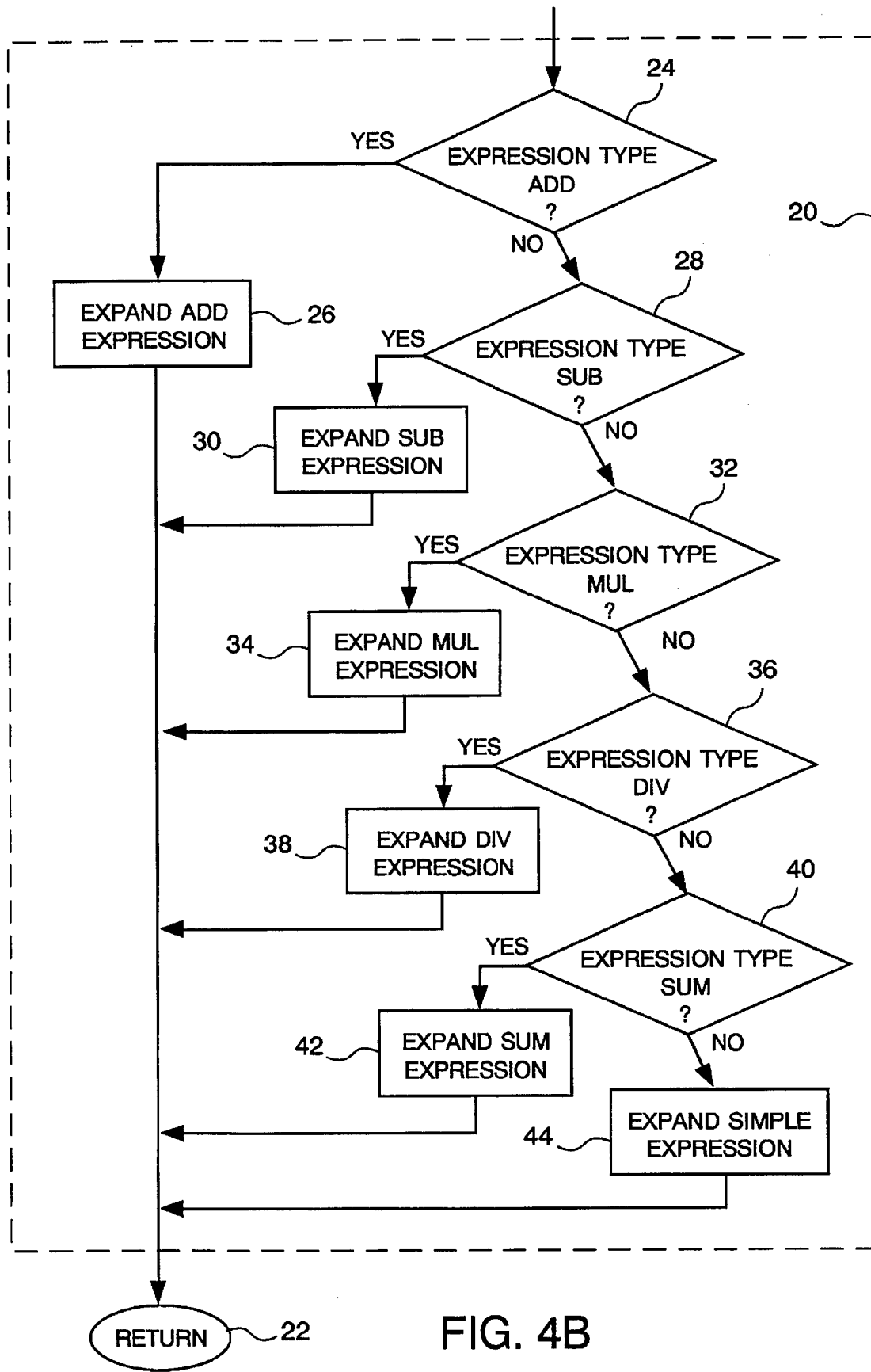
Figure 4C:
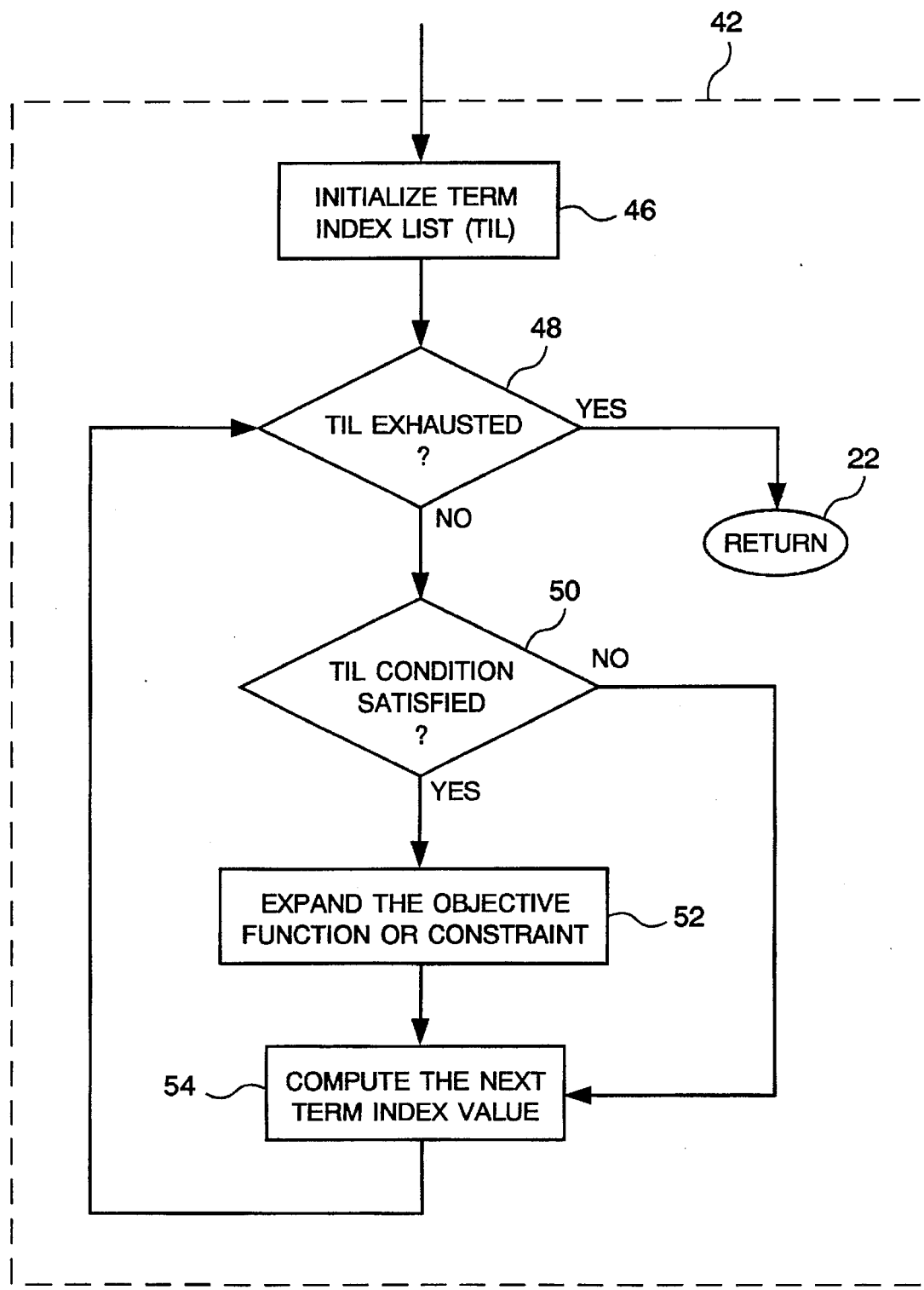

The step of expanding the SUM expression, block 42, is further illustrated in FIG. 4C (similar procedure as FIG. 4A). The method begins with the step of initializing the Term Index List (TIL) as shown by block 46. This step is similar to step 12 but applies to the terms giving rise to horizontal expansion.

The step of expanding the SUM expression continues with the step of determining whether the TIL is exhausted as shown by block 48. If the TIL is exhausted, the method proceeds to step 22 and computes the next index value.

If the TIL is not exhausted, however, the method proceeds with an optional step of determining whether a TIL condition is satisfied as shown by conditional block 50. If the TIL condition is satisfied, the method proceeds with the step of expanding the objective function or the constraint as shown by block 52, which is also illustrated in FIG. 4B.

Next, if the TIL condition is not satisfied or upon completing the expansion of the objective function or constraint, the method proceeds with the step of computing the next term index value as shown by block 54. The step is further illustrated in FIG. 4D.

Figure 4D:
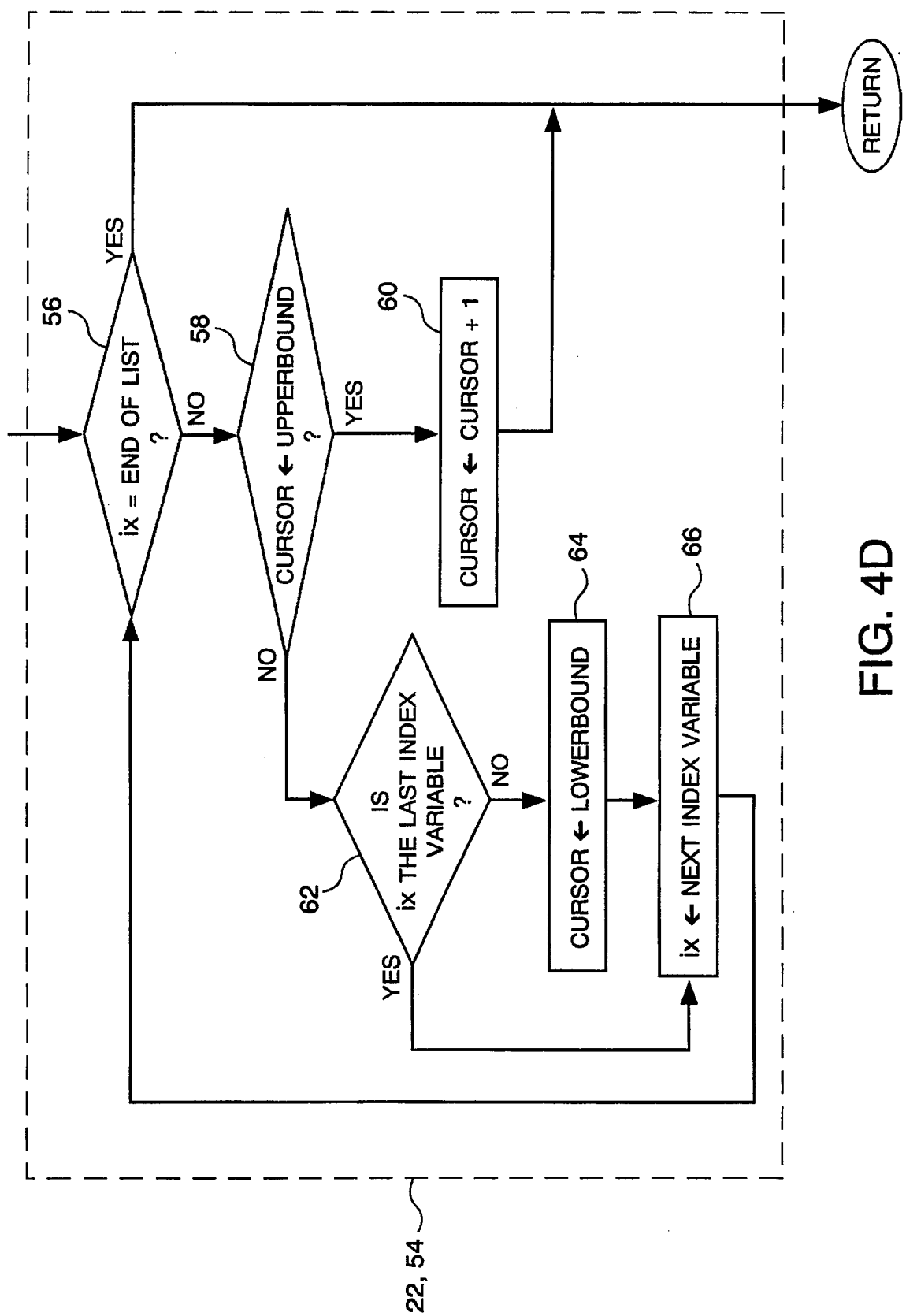

FIG. 4D illustrates the general sequence of steps associated with efficient index computation which is accomplished utilizing the computer program outlined above. The method begins with the step of determining whether ix (or pointer of the corresponding index link record) is pointing to the end of the list as shown by conditional block 56.

If the pointer is at the end of the list, the method returns to either step 14 or step 50, accordingly.

However, if the pointer is not at the end of the list, the method proceeds with the step of determining whether the cursor is less than the upper-bound limit as shown by conditional block 58. If the cursor is less than the upper-bound limit, the method proceeds with the step of incrementing the cursor as shown by block 60 and then returning to either step 14 or step 50, accordingly.

If the cursor is not less than the upper-bound limit, the method proceeds with the step of determining whether the pointer or ix is the last index variable as shown by conditional block 62. If the pointer is not the last index variable, the cursor is reset to its lower-bound limit as shown by block 64.

If the pointer is the last index variable or upon resetting the cursor to its lower-bound limit, the method proceeds with the step of setting the pointer to the next index variable as shown by block 66.

The method outlined in FIGS. 4A–4D expand the row indices and summations of the objective function and the constraint relationships of an optimization problem into an algebraic expression for use with a solver.

Figure 5:
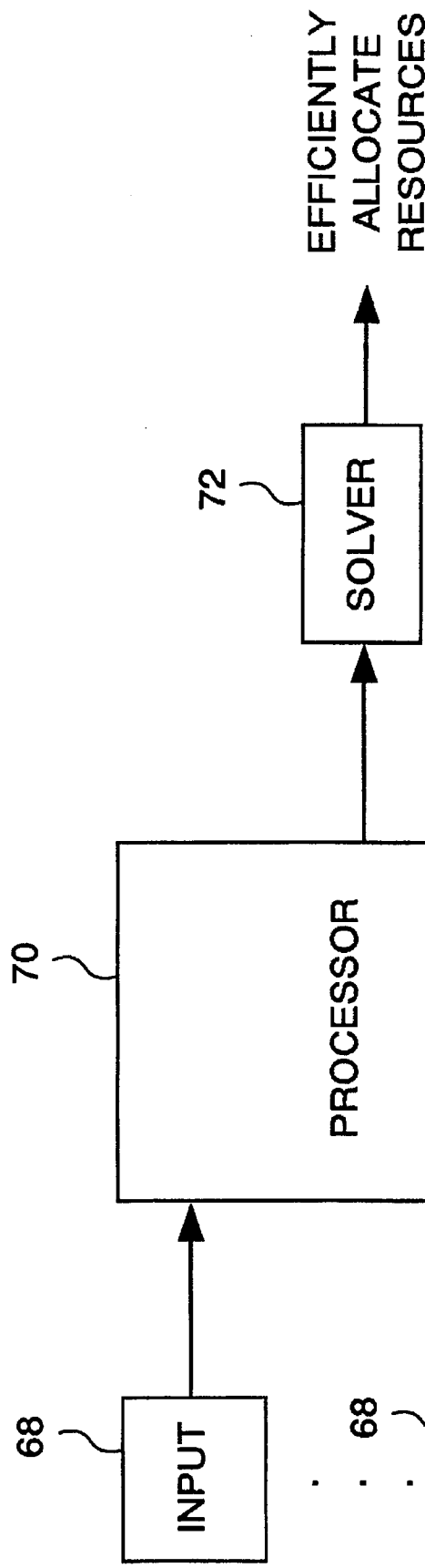
FIG. 5 is a block diagram of the preferred embodiment of the present invention.

The system of the present invention is illustrated in FIG. 5. The system includes inputs 68 operatively connected to a processor 70. The inputs 68 include the resources to be allocated and all constraints on the resources, if any. For example, an input 68 may include various plant locations, various sales offices, the cost of shipping from each plant location to each sales office, the demand at each sales office, etc.

The inputs are fed into a processor 70 which processes the information into a format recognized by a solver 72. The solver 72 is operatively connected to the processor 70 and obtains a solution to the resource allocation problem. A typical mixed integer linear programming solver, such as a Karmarker, Simplex or CPLEX, may be utilized. The resource is then physically allocated in accordance with the solution obtained by the solver 72.

While the best modes for carrying out the invention have been described in detail, those familiar with the art to which this invention relates will recognize various alternative designs and embodiments for practicing the invention as defined by the following claims.

What is claimed is:

1. In a method of processing and expanding index variables listed in an objective function and at least one constraint relationship into standard linear programming format to obtain a solution in determining efficient resource allocation utilizing a corresponding solver, of the type wherein the index variables and their properties are defined and transferred to a symbol table during a syntax analysis phase, portions of the symbol table relating to the index variables requiring expansion are transferred to a plurality of temporary data records containing information stored in the symbol table, and the temporary data records are linked in a forward order during expansion, wherein the improvement comprises:

generating an index link record for each of the index variables so as to eliminate the need for the symbol table and the plurality of temporary data records;

linking the index link records of the index variables requiring expansion in a reverse order of the order listed in the objective function and the at least one constraint relationship into an expanded form so as to reduce the number of traversals performed during expansion processing, the index link records having a pointer for identifying the next index variable requiring expansion; and allocating the resource based on the expanded form.

2. The method of claim 1 wherein each of the index link records contain definition information and expansion information.

3. The method of claim 2 wherein the definition information includes a name of the index variable and a lower-bound and an upper-bound range of the index variable.

4. The method of claim 2 wherein the expansion information includes a pointer for identifying the next index variable requiring expansion and a cursor for ranging from the lower-bound range to the upper-bound range of the corresponding index variable.

5. The method of claim 1 wherein the step of linking the index link records in a reverse order comprises:

(a) setting the pointer of the index link record of a first index variable listed in the objective function or the at least one constraint relationship as an end of an expansion list;

(b) determining whether there is a second index variable listed in the objective function or the at least one constraint relationship;

(c) setting the pointer of the index link record of the second index variable listed in the objective function or the at least one constraint relationship to the first index variable; and (d) repeating steps (b) and (c) until no more index variables are listed in the objective function or the at least one constraint relationship.

6. For use in determining efficient resource allocation, a computerized method for translating an optimization problem requiring expansion of a summation expression into standard linear programming format to obtain a solution utilizing a corresponding solver, comprising:

generating an objective function corresponding to an algebraic model of a goal of the optimization problem, the objective function including index variables corresponding to variables involved in the optimization problem;

generating at least one constraint relationship corresponding to an algebraic model of physical constraints on the variables involved in the optimization problem;

generating an index record for each index variable containing both static information and dynamic information, the static information representing index variable names and index variable lower-bound ranges and upper-bound ranges, and the dynamic information corresponding to an expansion record for maintaining a cursor value corresponding to an integer value between the lower-bound ranges and the upper-bound ranges of each of the index variables and a pointer for linking together index variables requiring expansion;

expanding the index variables of the objective function and the at least one constraint relationship in a reverse order so as to translate the optimization problem into the standard linear programming format;

providing the translated optimization problem to the solver to obtain a solution; and physically allocating the resource in accordance with the solution.

* * * * *